US012795738B2

(12) United States Patent
Loehr et al.

(10) Patent No.: US 12,795,738 B2
(45) Date of Patent: Nov. 10, 2026

(54) PUSCH TRANSMISSION USING AN AGGREGATION FACTOR

(71) Applicant: Lenovo (Singapore) Pte. Ltd., New Tech Park (SG)

(72) Inventors: Joachim Loehr, Wiesbaden (DE); Alexander Johann Maria Golitschek Edler von Elbwart, Darmstadt (DE); Prateek Basu Mallick, Dreieich (DE); Vijay Nangia, Woodridge, IL (US); Hyejung Jung, Northbrook, IL (US); Ravi Kuchibhotla, Chicago, IL (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 337 days.

(21) Appl. No.: 18/601,674

(22) Filed: Mar. 11, 2024

(65) Prior Publication Data

US 2024/0224340 A1 Jul. 4, 2024

Related U.S. Application Data

(63) Continuation of application No. 17/249,346, filed on Feb. 26, 2021, now Pat. No. 11,956,830, which is a (Continued)

(51) Int. Cl.
*H04W 74/0833* (2024.01)
*H04W 72/21* (2023.01)
(Continued)

(52) U.S. Cl.
CPC ....... *H04W 74/0833* (2013.01); *H04W 72/21* (2023.01); *H04W 72/23* (2023.01); *H04W 74/0838* (2024.01)

(58) Field of Classification Search
CPC . H04W 74/0833; H04W 72/21; H04W 72/23; H04W 74/0838; H04W 74/004;
(Continued)

(56) References Cited

U.S. PATENT DOCUMENTS

2011/0292911 A1 12/2011 Uemura et al.
2016/0302080 A1* 10/2016 Hwang .................. H04L 69/28
(Continued)

FOREIGN PATENT DOCUMENTS

EP 3288327 A1 2/2018

OTHER PUBLICATIONS

Catt, "Random access design for UEs in enhanced coverage mode", 3GPP TSG RAN WG1 Meeting #75 R1-135065, Nov. 11-15, 2013, pp. 1-3.
(Continued)

*Primary Examiner* — Ian N Moore
*Assistant Examiner* — Latresa A McCallum
(74) *Attorney, Agent, or Firm* — Kunzler Needham Hilton

(57) ABSTRACT

Apparatuses, methods, and systems are disclosed for PUSCH transmission using an aggregation factor. One method includes selecting, at a user equipment, a physical random access channel preamble. The method includes transmitting the physical random access channel preamble. The method includes, in response to transmitting the physical random access channel preamble, receiving a random access response message comprising an uplink grant for transmission of a physical uplink shared channel. The method includes transmitting the physical uplink shared channel according to the uplink grant using a first physical uplink shared channel aggregation factor. The user equipment is configured with a second physical uplink shared channel aggregation factor.

20 Claims, 8 Drawing Sheets

Related U.S. Application Data continuation of application No. 16/404,608, filed on May 6, 2019, now Pat. No. 10,952,255.

(60) Provisional application No. 62/667,378, filed on May 4, 2018.

(51) Int. Cl.
*H04W 72/23* (2023.01)
*H04W 74/0838* (2024.01)

(58) Field of Classification Search
CPC .... H04W 72/1268; H04L 1/08; H04L 5/0053; H04L 5/0094
See application file for complete search history.

(56) References Cited

U.S. PATENT DOCUMENTS

| | | | | |
|---|---|---|---|---|
| 2016/0330768 | A1* | 11/2016 | Hu | H04W 74/006 |
| 2016/0381712 | A1* | 12/2016 | Yang | H04L 5/0053 370/329 |
| 2018/0139668 | A1 | 5/2018 | Takahashi et al. | |
| 2018/0368188 | A1* | 12/2018 | Aiba | H04W 74/0833 |
| 2019/0261407 | A1 | 8/2019 | Irukulapati et al. | |
| 2019/0342921 | A1 | 11/2019 | Loehr et al. | |
| 2020/0350950 | A1 | 11/2020 | Yao et al. | |
| 2021/0112590 | A1* | 4/2021 | Kim | H04B 1/7143 |

OTHER PUBLICATIONS

LG Electronics, "Repetition level configuration for MTC UEs in enhanced coverage", 3GPP TSG RAN WG1 Meeting #81 R1-152710, May 25-29, 2015, pp. 1-3.

3GPP, "3rd Generation Partnership Project; Technical Specification Group Radio Access Network; NR; Medium Access Control (MAC) protocol specification (Release 15)", 3GPP TS 38.321 V15.1.0, Mar. 2018, pp. 1-67.

3GPP, "3rd Generation Partnership Project; Technical Specification Group Radio Access Network; NR; Physical channels and modulation (Release 15)", 3GPP TS 38.211 V15.1.0, Mar. 2018, pp. 1-90.

3GPP, "3rd Generation Partnership Project; Technical Specification Group Radio Access Network; NR; Physical layer procedures for control (Release 15)", 3GPP TS 38.213 V15.1.0, Mar. 2018, pp. 1-77.

3GPP, "3rd Generation Partnership Project; Technical Specification Group Radio Access Network; NR; Physical layer procedures for data (Release 15)", 3GPP TS 38.214 V15.1.0, Mar. 2018, pp. 1-77.

Samsung_Miscellaneous_corrections_38321_CR0057R3_(Rel-15)_R2-1807541_3GPP_TSG-RAN_WG2_Meeting_#102_68_Pages.

Samsung, Miscellaneous Correction R2-1806229 3GPP TSG-RAN WG2 Meeting #101bis, Sanya, China, Apr. 16-20, 2018.

Huawei, Hisilicon, "Corrections on the RAN1/4 UE capability description in 38.306", 3GPP TSG-RAN WG2 101bis R2-1805598, Apr. 16-20, pp. 1-10.

* cited by examiner

PUSCH TRANSMISSION USING AN AGGREGATION FACTOR

CROSS-REFERENCE TO RELATED APPLICATIONS

This application is a continuation application of U.S. application Ser. No. 17/249,346 filed on Feb. 26, 2021, which is a continuation application of U.S. application Ser. No. 16/404,608 filed on May 6, 2019, which claims priority to U.S. Patent Application Ser. No. 62/667,378 entitled "PUSCH AGGREGATION FOR RACH MSG3 TRANSMISSION" and filed on May 4, 2018 for Joachim Loehr, all of which are incorporated herein by reference in their entirety.

FIELD

The subject matter disclosed herein relates generally to wireless communications and more particularly relates to PUSCH transmission using an aggregation factor.

BACKGROUND

The following abbreviations are herewith defined, at least some of which are referred to within the following description: Third Generation Partnership Project ("3GPP"), 4th Generation ("4G"), 5th Generation ("5G"), 5G System ("5GS"), Authorization Authentication ("AA"), Authorization Authentication Request ("AAR"), Positive-Acknowledgment ("ACK"), Application Function ("AF"), Aggregation Level ("AL"), Access and Mobility Management Function ("AMF"), Access Network ("AN"), Access Point ("AP"), Authentication Server Function ("AUSF"), Attribute Value Pair ("AVP"), Broadcast Control Channel ("BCCH"), Beam Failure Detection ("BFD"), Block Error Rate ("BLER"), Binary Phase Shift Keying ("BPSK"), Base Station ("BS"), Buffer Status Report ("BSR"), Bandwidth ("BW"), Bandwidth Part ("BWP"), Cell-Radio Network Temporary Identifier ("C-RNTI"), Carrier Aggregation ("CA"), CA Network ("CAN"), Contention-Based Random Access ("CBRA"), Clear Channel Assessment ("CCA"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Commercial Mobile Alert Service ("CMAS"), Core Network ("CN"), Coordinated Multipoint ("COMP"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), EPS Connection Management ("ECM"), Enhanced Mobile Broadband ("eMBB"), Enhanced MTC ("eMTC"), Evolved Node B ("eNB"), Effective Isotropic Radiated Power ("EIRP"), European Telecommunications Standards Institute ("ETSI"), Earthquake and Tsunami Warning System ("ETWS"), Evolved Packet Core ("EPC"), Evolved Packet System ("EPS"), Evolved Universal Terrestrial Access ("E-UTRA"), Evolved Universal Terrestrial Access Network ("E-UTRAN"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range ("FR"), Guaranteed Bit Rate ("GBR"), 5G Node B or Next Generation Node B ("gNB"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Identity or Identifier ("ID"), Information Element ("IE"), International Mobile Equipment Identity ("IMEI"), IP Multimedia System ("IMS"), International Mobile Subscriber Identity ("IMSI"), International Mobile Telecommunications ("IMT"), Internet-of-Things ("IoT"), Internet Protocol ("IP"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MME"), Multimedia Telephony ("MMTEL"), Mobile Network Operator ("MNO"), massive MTC ("mMTC"), Maximum Power Reduction ("MPR"), Multimedia Priority Service ("MPS"), Machine Type Communication ("MTC"), Multi User Shared Access ("MUSA"), Inter-CN Interface Between a 4G MME and a 5GS AMF ("N26"), Non Access Stratum ("NAS"), Narrowband ("NB"), Negative-Acknowledgment ("NACK") or ("NAK"), Network Entity ("NE"), Network Function ("NF"), Next Generation RAN ("NG-RAN"), Non-Orthogonal Multiple Access ("NOMA"), New Radio ("NR"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Cover Codes ("OCC"), Orthogonal Frequency Division Multiplexing ("OFDM"), Open-Loop ("OL"), Other System Information ("OSI"), Paging-Radio Network Temporary Identifier ("P-RNTI"), P-Access-Network-Info ("PANI"), Power Angular Spectrum ("PAS"), Physical Broadcast Channel ("PBCH"), Power Control ("PC"), LTE-to-V2X Interface ("PC5"), Primary Cell ("PCell"), Policy Control Function (""PCF"), Physical Cell ID ("PCID"), Policy and Charging Rules Function ("PCRF"), Proxy-Call Session Control Function ("P-CSCF"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Packet Data Network Gateway ("PGW"), Packet Data Network Gateway-Control ("PGW-C"), Packet Data Network Gateway-User ("PGW-U"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Provisional Response Acknowledgement ("PRACK"), Physical Resource Block ("PRB"), Primary Secondary Cell ("PSCell"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Random Access-Radio Network Temporary Identifier ("RA-RNTI"), Registration Area ("RA"), Radio Access Network ("RAN"), Radio Access Technology ("RAT"), Random Access Procedure ("RACH"), Random Access Response ("RAR"), Resource Element Group ("REG"), Radio Frequency ("RF"), Radio Link Control ("RLC"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RTT"), Receive ("RX"), System Information-Radio Network Temporary Identifier ("SI-RNTI"), Serving-Call Session Control Function ("S-CSCF"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Session Description Protocol ("SDP"), Service Data Unit ("SDU"), Serving Gateway ("SGW"), System Information ("SI"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Session Initiation Protocol ("SIP"), Service Level Agreement ("SLA"), Session Management ("SM"), Session Management Function ("SMF"), Special Cell ("SpCell"), Single Network Slice Selection Assistance Information ("S-NSSAI"), Shortened TTI ("sTTI"), Synchronization Signal ("SS"), Synchronization Signal Block ("SSB"), Supplementary Uplink ("SUL"), Subscriber Permanent Identifier ("SUPI"), Temporary Cell-Radio Network Temporary Identifier ("TC-RNTI"), Tracking Area ("TA"), TA Indicator ("TAI"), TA Update ("TAU"), Transport Block ("TB"), Transport Block Size ("TBS"), Time-Division Duplex ("TDD"), Time Division Multiplex ("TDM"), Time Division Orthogonal Cover Code ("TD-OCC"), Tunnel Endpoint Identifier ("TEID"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane ("UP"), User Plane Function ("UPF"), Uplink Pilot Time Slot ("UpPTS"), Ultra-reliability and Low-latency Communications ("URLLC"), UE Route Selection Policy ("URSP"), LTE Radio Interface ("Uu"), Vehicle-To-Everything ("V2X"), Visiting AMF ("vAMF"), Visiting NSSF ("vNSSF"), Visiting PLMN ("VPLMN"), Interconnecting Interface ("X2") ("Xn"), and Worldwide Interoperability for Microwave Access ("WiMAX").

In certain wireless communications networks, PUSCH transmissions may be used. In such networks, various configurations may be used for the PUSCH transmission.

BRIEF SUMMARY

Methods for PUSCH transmission using an aggregation factor are disclosed. Apparatuses and systems also perform the functions of the apparatus. One embodiment of a method includes selecting, at a user equipment, a physical random access channel preamble. In certain embodiments, the method includes transmitting the physical random access channel preamble. In some embodiments, the method includes, in response to transmitting the physical random access channel preamble, receiving a random access response message comprising an uplink grant for transmission of a physical uplink shared channel. In various embodiments, the method includes transmitting the physical uplink shared channel according to the uplink grant using a first physical uplink shared channel aggregation factor. In such embodiments, the user equipment is configured with a second physical uplink shared channel aggregation factor.

One apparatus for PUSCH transmission using an aggregation factor includes a processor that selects, at the user equipment, a physical random access channel preamble. In some embodiments, the apparatus includes a transmitter that transmits the physical random access channel preamble. In various embodiments, the apparatus includes a receiver that, in response to transmitting the physical random access channel preamble, receives a random access response message comprising an uplink grant for transmission of a physical uplink shared channel. In such embodiments, the transmitter transmits the physical uplink shared channel according to the uplink grant using a first physical uplink shared channel aggregation factor, and the user equipment is configured with a second physical uplink shared channel aggregation factor.

One method for PUSCH reception using an aggregation factor includes receiving a physical random access channel preamble selected at a user equipment. In certain embodiments, the method includes, in response to receiving the physical random access channel preamble, transmitting a random access response message comprising an uplink grant for transmission of a physical uplink shared channel. In some embodiments, the method includes receiving the physical uplink shared channel according to the uplink grant using a first physical uplink shared channel aggregation factor. In such embodiments, the user equipment is configured with a second physical uplink shared channel aggregation factor.

One apparatus for PUSCH reception using an aggregation factor includes a receiver that receives a physical random access channel preamble selected at a user equipment. In certain embodiments, the apparatus includes a transmitter that, in response to receiving the physical random access channel preamble, transmits a random access response message comprising an uplink grant for transmission of a physical uplink shared channel. In such embodiments, the receiver receives the physical uplink shared channel according to the uplink grant using a first physical uplink shared channel aggregation factor, and the user equipment is configured with a second physical uplink shared channel aggregation factor.

One method for PUSCH transmission using an aggregation factor includes determining whether a user equipment is in a radio resource control connected state. In some embodiments, the method includes determining whether the user equipment is performing a contention-based random access procedure. In various embodiments, the method includes in response to: the user equipment being in the radio resource control connected state; and the user equipment performing a contention-based random access procedure, transmitting a physical uplink shared channel scheduled by a random access response uplink grant with a physical uplink shared channel aggregation factor of one.

One apparatus for PUSCH transmission using an aggregation factor includes a processor that: determines whether the user equipment is in a radio resource control connected state; and determines whether the user equipment is performing a contention-based random access procedure. In some embodiments, the apparatus includes a transmitter that, in response to: the user equipment being in the radio resource control connected state; and the user equipment performing a contention-based random access procedure, transmits a physical uplink shared channel scheduled by a random access response uplink grant with a physical uplink shared channel aggregation factor of one.

One method for PUSCH transmission using an aggregation factor includes selecting a physical random access channel preamble. In certain embodiments, the method includes transmitting the physical random access channel preamble. In some embodiments, the method includes, in response to transmitting the physical random access channel preamble, receiving a first random access response message comprising a first uplink grant for transmission of a physical uplink shared channel message 3. In various embodiments, the method includes transmitting a number of hybrid automatic repeat request transmissions for the physical uplink shared channel message 3 in at least one slot. In such embodiments, the number of hybrid automatic repeat request transmissions for the physical uplink shared channel message 3 is determined based at least in part on information indicated within the first random access response message.

One apparatus for PUSCH transmission using an aggregation factor includes a processor that selects a physical random access channel preamble. In some embodiments, the apparatus includes a transmitter that transmits the physical random access channel preamble. In certain embodiments, the apparatus includes a receiver that, in response to transmitting the physical random access channel preamble, receives a first random access response message comprising a first uplink grant for transmission of a physical uplink shared channel message 3. In such embodiments, the transmitter transmits a number of hybrid automatic repeat request transmissions for the physical uplink shared channel message 3 in at least one slot, and the number of hybrid automatic repeat request transmissions for the physical uplink shared channel message 3 is determined based at least in part on information indicated within the first random access response message.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
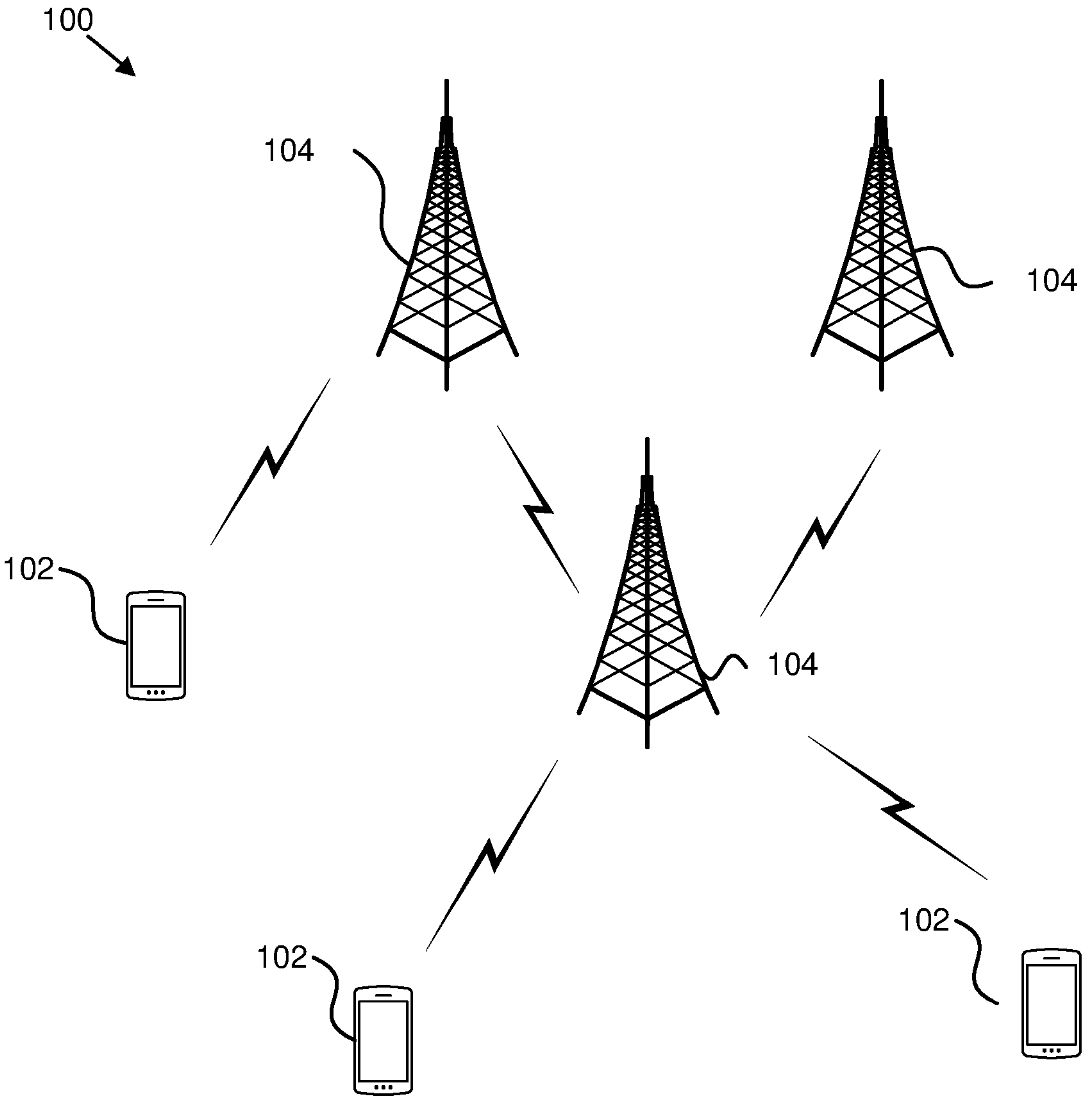
FIG. 1 is a schematic block diagram illustrating one embodiment of a wireless communication system for PUSCH transmission and/or reception using an aggregation factor.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for PUSCH transmission and/or reception using an aggregation factor. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In certain embodiments, a remote unit 102 may select, at the remote unit 102 (e.g., a user equipment), a physical random access channel preamble. In certain embodiments, the remote unit 102 may transmit the physical random access channel preamble. In some embodiments, the remote unit 102 may, in response to transmitting the physical random access channel preamble, receive a random access response message comprising an uplink grant for transmission of a physical uplink shared channel. In various embodiments, the remote unit 102 may transmit the physical uplink shared channel according to the uplink grant using a first physical uplink shared channel aggregation factor. In such embodiments, the remote unit 102 is configured with a second physical uplink shared channel aggregation factor. Accordingly, the remote unit 102 may be used for PUSCH transmission using an aggregation factor.

In one embodiment, a network unit 104 may receive a physical random access channel preamble selected at a user equipment. In certain embodiments, the network unit 104 may, in response to receiving the physical random access channel preamble, transmit a random access response message comprising an uplink grant for transmission of a physical uplink shared channel. In some embodiments, the network unit 104 may receive the physical uplink shared channel according to the uplink grant using a first physical uplink shared channel aggregation factor. In such embodiments, the user equipment is configured with a second physical uplink shared channel aggregation factor. Accordingly, the network unit 104 may be used for PUSCH reception using an aggregation factor.

In certain embodiments, a remote unit 102 may determine whether the remote unit 102 (e.g., a user equipment) is in a radio resource control connected state. In some embodiments, the remote unit 102 may determine whether the remote unit 102 is performing a contention-based random access procedure. In various embodiments, the remote unit 102 may, in response to: the remote unit 102 being in the radio resource control connected state; and the remote unit 102 performing a contention-based random access procedure, transmit a physical uplink shared channel scheduled by a random access response uplink grant with a physical uplink shared channel aggregation factor of one. Accordingly, the remote unit 102 may be used for PUSCH transmission using an aggregation factor.

In certain embodiments, a remote unit 102 may select a physical random access channel preamble. In certain embodiments, the remote unit 102 may transmit the physical random access channel preamble. In some embodiments, the remote unit 102 may, in response to transmitting the physical random access channel preamble, receive a first random access response message comprising a first uplink grant for transmission of a physical uplink shared channel message 3. In various embodiments, the remote unit 102 may transmit a number of hybrid automatic repeat request transmissions for the physical uplink shared channel message 3 in at least one slot. In such embodiments, the number of hybrid automatic repeat request transmissions for the physical uplink shared channel message 3 is determined based at least in part on information indicated within the first random access response message. Accordingly, the remote unit 102 may be used for PUSCH transmission using an aggregation factor.

Figure 2:
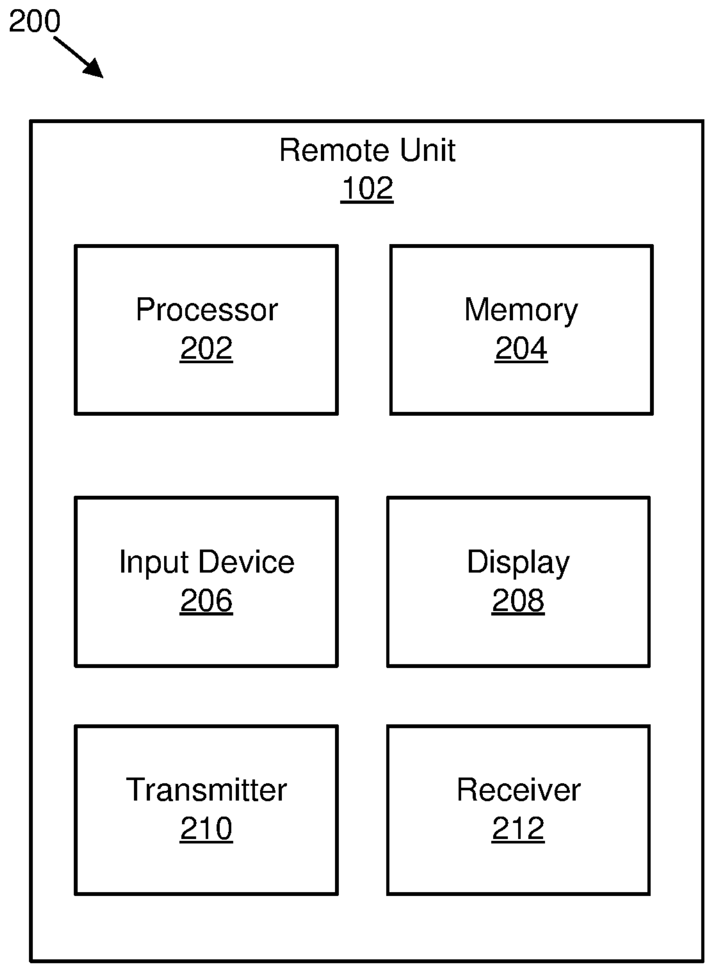
FIG. 2 is a schematic block diagram illustrating one embodiment of an apparatus that may be used for PUSCH transmission using an aggregation factor.

FIG. 2 depicts one embodiment of an apparatus 200 that may be used for PUSCH transmission using an aggregation factor. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In certain embodiments, the processor 202 selects a physical random access channel preamble. In various embodiments, the processor 202: determines whether the user equipment is in a radio resource control connected state; and determines whether the user equipment is performing a contention-based random access procedure. In some embodiments, the processor 202 selects a physical random access channel preamble. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In various embodiments, the transmitter 210 transmits the physical random access channel preamble. In some embodiments, the receiver 212, in response to transmitting the physical random access channel preamble, receives a random access response message comprising an uplink grant for transmission of a physical uplink shared channel. In certain embodiments, the transmitter 210 transmits the physical uplink shared channel according to the uplink grant using a first physical uplink shared channel aggregation factor, and the remote unit 102 is configured with a second physical uplink shared channel aggregation factor.

In various embodiments, the transmitter 210, in response to: the user equipment being in the radio resource control connected state; and the user equipment performing a contention-based random access procedure, transmits a physical uplink shared channel scheduled by a random access response uplink grant with a physical uplink shared channel aggregation factor of one. In certain embodiments, the receiver 212, in response to transmitting the physical random access channel preamble, receives a first random access response message comprising a first uplink grant for transmission of a physical uplink shared channel message 3. In various embodiments, the transmitter 210 transmits a number of hybrid automatic repeat request transmissions for the physical uplink shared channel message 3 in at least one slot, and the number of hybrid automatic repeat request transmissions for the physical uplink shared channel message 3 is determined based at least in part on information indicated within the first random access response message.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
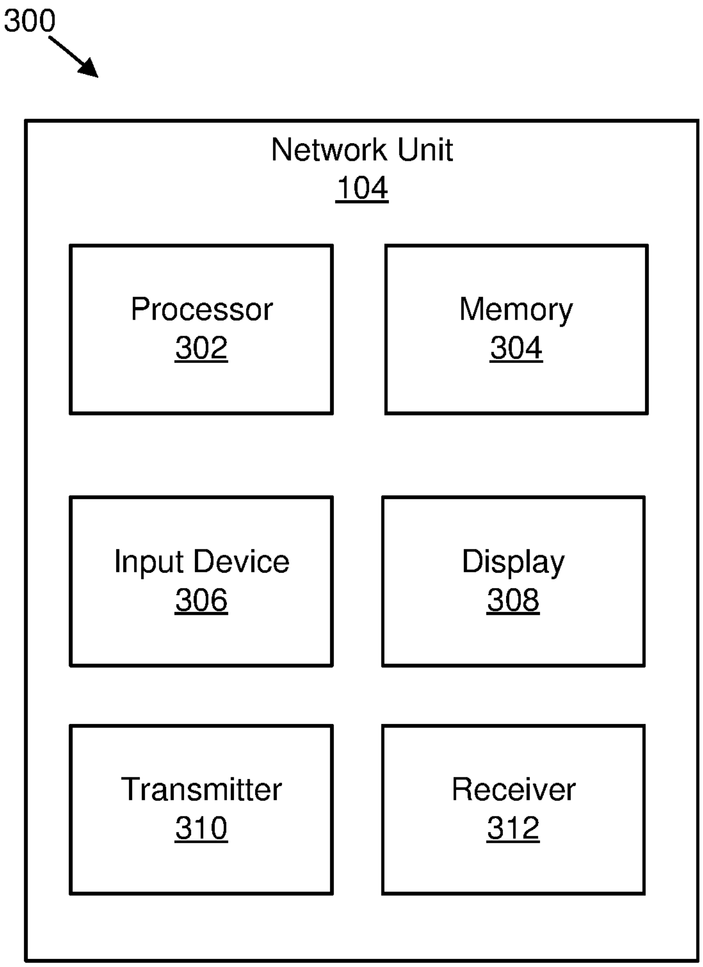
FIG. 3 is a schematic block diagram illustrating one embodiment of an apparatus that may be used for PUSCH reception using an aggregation factor.

FIG. 3 depicts one embodiment of an apparatus 300 that may be used for PUSCH reception using an aggregation factor. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the receiver 312 receives a physical random access channel preamble selected at a user equipment (e.g., the remote unit 102). In certain embodiments, the transmitter 310, in response to receiving the physical random access channel preamble, transmits a random access response message comprising an uplink grant for transmission of a physical uplink shared channel. In various embodiments, the receiver 312 receives the physical uplink shared channel according to the uplink grant using a first physical uplink shared channel aggregation factor, and the user equipment is configured with a second physical uplink shared channel aggregation factor.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, different TB sizes for a RACH message 3 may impact various parameters for a PUSCH transmission, such as a required signal-to-noise ratio, $Es/N_0$ (e.g., dB), and/or a desired target block error rate BLER (e.g., 10%). For example, a TB size of 72 bits may lead to more than a 0.6 dB increase in required Es/N0 compared to TB size of 56 bits under the same conditions.

In certain embodiments, an RRC connection request message may fit into a TB size of 56 bits by segmenting a message between message 3 and message 5 and shortening a MAC header by 1 byte. In various embodiments, an RRC connection resume request message (e.g., for inactive UEs) may not fit into a TB size of 56 bits, but may fit into a 72 bit TB size by: reducing a RNTI length for the RRC connection resume request; removing a 1 byte MAC header; and/or reducing a number of bits used for cause values and/or spare bits.

In some embodiments, slot aggregation may be used in which a data transmission is scheduled to span one or multiple slots. For UL slot aggregation (e.g., PUSCH transmissions), a UE may be configured by RRC signalling with a number of repetitions (e.g., a pusch-aggregationFactor or aggregationFactorUL). In some embodiments, if a UE is configured with an aggregationFactorUL>1, the same symbol allocation may be applied across aggregationFactorUL consecutive slots and PUSCH may be limited to a single transmission layer. In such embodiments, the UE may repeat the TB across the aggregationFactorUL consecutive slots applying the same symbol allocation in each slot.

In certain embodiments, from a MAC's perspective, a repetitions look like a HARQ retransmissions of a TB. In various embodiments, if a MAC entity is configured with a pusch-AggregationFactor>1, the parameter pusch-AggregationFactor provides a number of transmissions of a TB within a bundle of a dynamic grant. In such embodiments, after the initial transmission, pusch-AggregationFactor-1 HARQ retransmissions follow within the bundle.

In some embodiments, slot aggregation for PUSCH transmissions is only applicable to RRC connected UEs (e.g., pusch-AggregationFactor is a UE specific PUSCH parameter applicable to a particular BWP and configured in a PUSCH-config IE). In certain embodiments, slot aggregation may not be applicable to RACH message 3 transmissions for IDLE UEs or UEs in an INACTIVE state. Described herein are various methods and related signaling for how to support slot aggregation for message 3 during a RAR for UEs in RRC_IDLE and RRC_INACTIVE states.

In various embodiments, such as in eMTC, a max number of message 3 repetitions may be cell-specifically configured (e.g., in SIB2), via an IE "PUSCH-ConfigCommon-v1310," and a number of message 3 PUSCH repetitions may be indicated in a RAR grant selected from a set of values depending on a selected enhanced coverage level.

In some embodiments, a UE may implicitly indicate that a message 3 size is larger than a configured selection criterion by selecting a PRACH preamble from a preamble group (e.g., preamble group B) if the pathloss is less than a threshold.

In certain embodiments, a UE may apply different values of a PUSCH aggregation factor depending on whether PUSCH is for message 3, and the aggregation factor for message 3 may be determined based on a TBS of message 3.

In one embodiment, SI provides a group of PRACH preambles and/or reserved PRACH resources that indicate to a NE (e.g., eNB, gNB) that a UE requests slot aggregation for transmission of PUSCH message 3. For example, for UEs in a power-limited state, slot aggregation for message 3 sizes larger than 56 bits may be used to achieve a desired target BLER. In such an example, the group of PRACH preambles and/or reserved PRACH resources are to be used by the UEs that need to send larger message 3 PDUs. In some embodiments, a PRACH received on reserved resources (e.g., reserved preambles and/or time-frequency resources) may indicate to the NE that a larger message 3 size is requested. As may be appreciated, the use of the reserved resources (e.g., reserved preambles and/or time-frequency resources) may or may not be linked to a radio condition (e.g., pathloss) of the UE. In certain embodiments, a preamble group and/or PRACH resource information with necessary thresholds may be broadcast on SI. In various embodiments, SI (e.g., SIB1) signals common PRACH parameters such as reserved PRACH preambles and/or resources used to indicate that slot aggregation is required for message 3 transmission. In some embodiments, to determine at a UE side whether slot aggregation should be applied for message 3 transmission to achieve a target BLER, the UE may check whether a path loss is above a predefined (e.g., or predetermined) threshold. As such, the UE determines whether it is power limited. In such embodiments, the UE may also check whether a message 3 size is larger than a predefined (e.g., or predetermined) size (e.g., 56 bits). If the path loss is above the predefined threshold and the message 3 size is larger than the predefined size, the UE selects a PRACH preamble and/or resource that indicates to a NE that slot aggregation for message 3 is required. In various embodiments, pathloss is not considered for selecting reserved PRACH resources (e.g., the reserved PRACH resources are selected only based on the message 3 size that the UE will send—based on an RRC message or procedure invoked by RRC). In such embodiments, as long as the UE is camped normally on a cell, it is allowed to perform RACH on the reserved PRACH resources if the required message 3 size is larger than a predetermined threshold (e.g., 56 bits). The predetermined threshold may be configurable by the network (e.g., in SIB1) for flexibility or may be configured as a fixed value to facilitate saving communication overhead (e.g., resources).

In some embodiments, a NE may configure two preamble groups per SSB for a contention-based random access procedure (e.g., random access preamble group A and random access preamble group B). In certain embodiments, the criteria for selecting a preamble from random access preamble group B is based on a message 3 size and a pathloss. For example, if the random access preamble group B exists and if the potential message 3 size (e.g., UL data available for transmission plus MAC header and, where required, MAC CEs) is greater than ra-Msg3SizeGroupA and the pathloss is less than PCMAX (of the serving cell performing the random access procedure)−preamble ReceivedTargetPower−deltaPreambleMsg3−messagePowerOffsetGroupB, then select the random access preamble group B, or else select the random access preamble group A.

In various embodiments, a NE may configure a third preamble group per SSB for a contention-based RACH (e.g., random access preambles group C). In such embodiments, a UE selects a preamble from group C if the potential message 3 size is greater than ra-Msg3SizeGroupA and optionally the pathloss is larger than or equal to PCMAX (of the Serving Cell performing the Random Access Procedure)–preambleReceivedTargetPower–deltaPreambleMsg3–messagePowerOffsetGroupB.

In some embodiments, different preambles and/or PRACH resources may be reserved to indicate a different required aggregation factor to a NE.

In certain embodiments, a NE may indicate within an RAR message whether a UE should apply slot aggregation for message 3 (e.g., PUSCH). In such embodiments, the NE may indicate a PUSCH aggregation factor to be applied for message 3 by signaling the PUSCH aggregation factor within a RAR UL grant. In various embodiments, there may be 3 reserved bits within an RAR UL grant. In some embodiments, one or more bits of the 3 reserved bits may be used to indicate an UL aggregation factor for message 3 (e.g., msg3) PUSCH transmission.

Table 1 illustrates one embodiment of the contents of an RAR UL grant starting with the MSB and ending with the LSB.

TABLE 1

Random Access Response Grant Content Field Size

| RAR Grant Field | Number of Bits |
|---|---|
| Frequency hopping flag | 1 |
| Msg3 PUSCH frequency resource allocation | 12 |
| Msg3 PUSCH time resource allocation | 4 |
| MCS | 4 |
| TPC command for Msg3 PUSCH | 3 |
| CSI request | 1 |
| Reserved bits | 3 |

In some embodiments, one or more of the reserved bits in the RAR UL grant (e.g., of Table 1) may be used to directly indicate an aggregation factor (e.g., the three reserved bits may be used to indicate an aggregation factor from 1 to 8), or the reserved bits may represent an index referring to a table with defined aggregation factors. In such embodiments, the table may be broadcast in system information.

In various embodiments, a NE issues a RAR in response to receiving a PRACH preamble indicating that slot aggregation is required for RACH message 3 transmission. In such embodiments, the RAR may include an indication of an aggregation factor to be used for the message 3 within the RAR UL grant. In certain embodiments, a UE may interpret the reserved bits of an RAR UL grant (e.g., in RACH message 2) as an indication of an aggregation factor for message 3 if it used a reserved PRACH preamble and/or PRACH resource (e.g., for RACH message 1) indicating to a gNB that slot aggregation is required for message 3 transmission. In some embodiments, a UE that has not used a reserved PRACH preamble and/or PRACH resource for message 1 transmission indicating that aggregation is required for message 3 may ignore the reserved bits and not apply slot aggregation for message 3.

In one embodiment, in response to receiving a preamble indicating the need for slot aggregation for message 3, a NE may indicate in an RAR UL grant an aggregation factor to be applied for message 3. In various embodiments, an already existing field in the RAR UL grant (e.g., as shown in Table 1) may be used for signaling an aggregation factor (e.g., the "TPC command for Msg3 PUSCH" field may be used to signal the aggregation factor). In such embodiments, a UE receiving an RAR uplink grant in response to having sent a preamble indicating the need for slot aggregation for message 3 may interpret the bits of the "TPC command for Msg 3 PUSCH" field as the aggregation factor to be applied for message 3 transmission.

In certain embodiments, a "CSI request" bit within the RAR UL grant may be used to signal whether to apply slot aggregation for message 3. In such embodiments, the "CSI request" bit set to "1" may order a UE to apply slot aggregation for message 3. Moreover, the aggregation factor to use may be broadcast by system information or fixed in the specification. Furthermore, the "CSI request" bit set to "0" may indicate that no slot aggregation is to be applied to message 3. In various embodiments, only UEs that have used a reserved PRACH preamble and/or resource for message 1 indicating that slot aggregation is required for message 3 may interpret the "CSI request" bit as an aggregation indicator.

In some embodiments, the IE PUSCH-TimeDomainResourceAllocation may be used to configure a time domain relationship between an UL grant (e.g., PDCCH) and a corresponding PUSCH, as illustrated in Table 2.

TABLE 2

PUSCH-TimeDomainResourceAllocation Information Element

```
-- ASN1START
-- TAG-PUSCH-TIMEDOMAINRESOURCEALLOCATION-START
PUSCH-TimeDomainResourceAllocation :: = SEQUENCE {
   -- Corresponds to L1 parameter 'K2' (see 38.214, section FFS Section)
   -- When the field is absent the UE applies the value 01 when PUSCH SCS is 15/30 KHz;
2 when PUSCH SCS is 60 KHz and 3 when PUSCH SCS is 120 KHz.
   k2                                                    INTEGER (0..7)
   OPTIONAL,     -- Need S
   -- Mapping type. Corresponds to L1 parameter 'Mapping-type' (see 38.214, section FFS_Section)
   mappingType                                 ENUMERATED { typeA, typeB},
   -- An index into a table/equation in RAN1 specs capturing valid combinations of start symbol
and length (jointly encoded)
   -- Corresponds to L1 parameter 'Index-start-len' (see 38.214, section FFS_Section)
   startSymbolAndLength                 BIT STRING (SIZE (7) )
}
--TAG-PUSCH-TIMEDOMAINRESOURCEALLOCATION-STOP
--ASN1STOP
```

Furthermore, within the IE PUSCH-ConfigCommon, a list of time domain allocations for timing of UL assignment to UL data (e.g., pusch-AllocationList) is included, as illustrated in Table 3.

TABLE 3

PUSCH-ConfigCommon Information Element

```
-- ASN1START
-- TAG-PUSCH-CONFIGCOMMON-START
PUSCH-ConfigCommon ::=                    SEQUENCE {
  -- Sequence-group hopping can be enabled or disabled by means of this cell-specific
parameter.
  -- Corresponds to L1 parameter 'Group-hopping-enabled-Transform-precoding' (see 38.211,
section FFS_Section)
  -- This field is Cell specific
  groupHoppingEnabledTransformPrecoding ENUMERATED { enabled}
                                                          OPTIONAL,    -- Need R
  -- List of time domain allocations for timing of UL assignment to UL data
  pusch-AllocationList                    SEQUENCE (SIZE(1..maxNrofUL-
Allocations) ) OF PUSCH-TimeDomainResourceAllocation OPTIONAL,    --Need R
  -- ------------------------
  -- Power control parameters
  -- Power offset between msg3 and RACH preamble transmission in steps of 1dB.
  -- Corresponds to L1 parameter 'Delta-preamble-msg3' (see 38.213, section 7.1)
msg3-DeltaPreamble                                        INTEGER (-1..6)
  OPTIONAL,      -- Need R
  -- P0 value for PUSCH with grant (except msg3). Value in dBm. Only even values (step size 2)
allowed.
  -- Corresponds to L1 parameter 'p0-nominal-pusch-withgrant' (see 38.213, section 7.1)
  -- This field is cell specific
  p0-NominalWithGrant                                   INTEGER (-202..24)
        OPTIONAL,       -- Need R
  . . .
}
-- TAG-PUSCH-CONFIGCOMMON-STOP
-- ASN1STOP
```

As may be appreciated, the IE PUSCH-Config Common may be signalled within system information.

In certain embodiments, certain entries of the PUSCH-AllocationList (e.g., a table that indicates the different timings of UL assignment to UL data, Table 3) may be used to signal to a UE that aggregation should be used for message 3 PUSCH. For example, the last two entries in Table 3 (e.g., entries 14 and 15) may implicitly indicate that the UE should apply an aggregation factor of 2 for a corresponding message 3 transmission. In such an example, the NE may set the "Msg3 PUSCH time resource allocation" field in the RAR UL grant to either 14 or 15 and the UE may follow the PUSCH time domain allocation (e.g., as defined in Table 3) and apply an aggregation factor of 2 for the corresponding message transmission. As may be appreciated, the aggregation factor of 2 is one example of an aggregation factor, but the actual aggregation factor may be any predetermined value, any configured value, and/or any preconfigured value.

In some embodiments, a new IE aggregationFactor-Msg3 may be included in PUSCH-ConfigCommon that indicates the aggregation factor that a UE is to use for RACH message 3. In certain embodiments, a UE applies the slot aggregation factor as provided by RRC signalling (e.g., system information) only for a contention-based random access procedure, and for contention-free RACH access, no slot aggregation is applied for a PUSCH scheduled by an UL grant in RAR (e.g., the aggregation factor is set to one). In various embodiments, if the UE performing contention-free random access is configured with a UE-specific PUSCH aggregation factor or a handover command that indicates a PUSCH aggregation factor to be used in a target cell, the UE applies the UE-specific PUSCH aggregation factor or the indicated PUSCH aggregation factor to transmit PUSCH scheduled by an UL grant in RAR.

In certain embodiments, a UE always applies slot aggregation for RACH message 3 (e.g., contention-based RACH) regardless of any configuration. In such embodiments, the aggregation factor may be fixed in the specification (e.g., set to 2).

In some embodiments, for a given subcarrier spacing of PUSCH, a UE may decide whether to perform message 3 PUSCH repetition based on a number of allocated resource blocks and/or a number of allocated OFDM symbols for message 3 PUSCH together with a message 3 TBS. In one example, the UE performs message 3 PUSCH repetition if slot-based PUSCH transmission is indicated, a number of allocated RBs is smaller than a certain value, and a message 3 TBS is larger than a certain value. As may be appreciated, while a NE may not be able to accurately determine whether a UE is in a power limited condition or not, the NE may still be able to determine slot-based (e.g., PUSCH with 14 OFDM symbols) verses non-slot based (e.g., PUSCH with less than 14 OFDM symbols) message 3 PUSCH transmissions based on a received PRACH preamble power and a preamble group that the received preamble belongs to. For example, slot based PUSCH is indicated to the UE if the received preamble power is lower than a target preamble receive power or a preamble group A is selected. Furthermore, non-slot based PUSCH is indicated if the received preamble power is [x]dB higher than the target preamble receive power and the preamble group B is selected. With non-slot based PUSCH for a given message 3 TBS, the NE may allocate a slightly larger number of RBs while maintaining a lower MCS that could provide additional gain in terms of required TX power thanks to coding and frequency diversity gains, compared to increasing the MCS while maintaining a smaller number of RB allocation. Thus, the NE may be likely to allocate a larger number of RBs (e.g., >2) and a smaller number of OFDM symbols (e.g., <14) for UEs to be considered in a non-power-limited condition for reducing RACH latency, while allocating a smaller number of RBs and a larger number of OFDM symbols (e.g., 14) for UEs to be considered in a power-limited condition. In some embodiments, to facilitate a successful delivery of message 3 for UEs considered to be in a power-limited condition, a NE may indicate or configure the UEs to perform message 3 PUSCH repetition if the message 3 PUSCH allocation meets predefined or configured conditions such that a number of allocated RBs is less than a threshold and/or a number of allocated OFDM/SC-FDMA symbols is larger than a threshold.

In certain embodiments, a RAR MAC CE indicates whether to use slot aggregation for message 3. In one embodiment, one or more reserved bits in a MAC payload for a random access response (illustrated in FIG. 4) is used in order to indicate the aggregation factor to be applied for message 3 scheduled by the an grant. In some embodiments, one of the reserved bits within a RAR MAC CE indicates whether a UE is to apply slot aggregation for message 3. In such embodiments, the aggregation factor may be configured by higher layer signaling (e.g., system information) or fixed in a specification.

Figure 4:
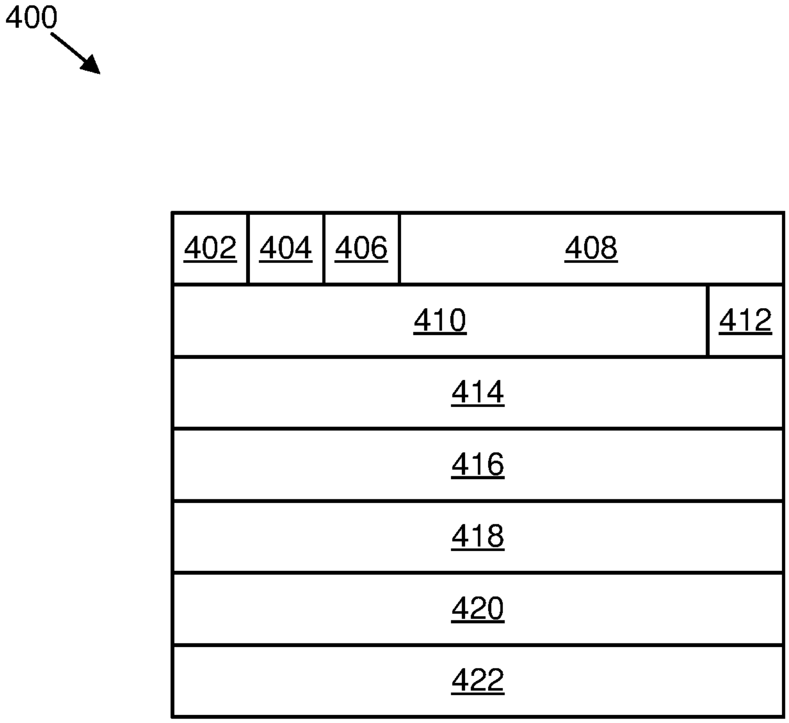
FIG. 4 is a schematic block diagram illustrating one embodiment of a MAC RAR.

FIG. 4 is a schematic block diagram illustrating one embodiment of a MAC RAR 400. The MAC RAR 400 includes a first reserved bit 402, a second reserved bit 404, a third reserved bit 406, a first portion of a timing advance command 408, a second portion of a timing advance command 410, a first portion of an UL grant 412, a second portion of an UL grant 414, a third portion of an UL grant 416, a fourth portion of an UL grant 418, a first portion of a temporary C-RNTI 420, and a second portion of a temporary C-RNTI 422.

In various embodiments, an aggregation factor may depend on a TBS that is determined by a RAR UL grant. The TBS may be determined from one or more fields in the RAR UL Grant (e.g., from the message 3 PUSCH frequency resource allocation and from MCS fields). The UE may apply an aggregation factor according to the TBS for message 3. In certain embodiments, there is a threshold TBS up to which a first aggregation factor is applied, and beyond which a second aggregation factor is applied. In some embodiments, all TBSs below a threshold TBS apply a first aggregation factor, and for TBSs greater than or equal to the threshold TBS, the second aggregation factor is applied. In various embodiments, to facilitate flexibility for different cell sizes or deployments, the first and second aggregation factor and the threshold TBS may be indicated in broadcast system information. In some embodiments, to save broadcast overhead, only one aggregation factor and the threshold TBS may be indicated in broadcast system information, and another aggregation factor may be derived from the broadcast aggregation factor (e.g., the second aggregation factor may be a multiple or a divisor of the first aggregation factor, the first aggregation factor may be a multiple or a divisor of the second aggregation factor). For example, if the first aggregation factor is broadcast, a multiplication factor of 2 to obtain the second aggregation factor may be used to support TBSs beyond the threshold TBS. As another example, if the second aggregation factor is broadcast, a multiplication factor of ½ (e.g., a division by 2) to obtain the first aggregation factor may be used to support TBSs beyond the threshold TBS. In various embodiments, only one aggregation factor may be indicated by broadcast system information, and the threshold TBS and the multiplier and/or divisor for obtaining the other aggregation factor may be a fixed value determined by a communication standard specification. In certain embodiments, all values may be indicated by a communication standard specification (e.g., a threshold of 56 bits up to which no slot aggregation occurs—equivalent to a first aggregation factor=1 and beyond which slot aggregation occurs with a second aggregation factor=2).

In one embodiment, a UE may decide whether to perform slot aggregation and/or repetition for message 3 PUSCH using an aggregation factor based on a message 3 TB size and a power status of the UE. For example, a UE that is power-limited (e.g., cell-edge UE) may use a different aggregation factor for a certain TB size than a non-power limited UE. The power status related criteria may be defined based on a pathloss and a maximum allowed transmission power for the serving cell in which the UE is performing the random access. According to one implementation, the criteria may be defined as the pathloss being less than $P_{CMAX}$ (of the serving cell performing the random access procedure)−preambleReceivedTargetPower−deltaPreambleMsg3−messagePowerOffsetGroupB. If the criteria is fulfilled (e.g., pathloss less than Pcmax−preamble ReceivedTargetPower−deltaPreambleMsg3−message PowerOffsetGroupB), the UE may use a different (e.g., smaller) aggregation factor (e.g., aggregation factor set to 1) for a certain TBS different from if the criteria is not fulfilled (e.g., pathloss larger or equal to Pcmax−preambleReceivedTarget-Power−deltaPreambleMsg3−message PowerOffset GroupB).

In certain embodiments, a NE indicates an aggregation factor in broadcast system information (e.g., such as SIB1) applicable to message 3 transmissions. In such embodiments, the RAR MAC CE may include a field (or a 1-bit flag) that indicates whether the UE applies the aggregation factor to its message 3 transmission. In some embodiments, the RAR MAC CE may include an on/off flag for the aggregation factor, or a multiplier (or divisor) of the aggregation factor. For example, SIB1 may indicate an aggregation factor=2. Then the RAR MAC CE may contain a 2-bit field that indicates how the UE may apply slot aggregation according to Table 4.

TABLE 4

| 2-bit field in the RAR MAC CE | UE applies the following for transmitting Msg3 |
|---|---|
| 00 | No slot aggregation |
| 01 | Slot aggregation using aggregation factor |
| 10 | Slot aggregation using 2 * aggregation factor |
| 11 | Slot aggregation using 4 * aggregation factor |

In one embodiment, if repetition of message 3 is not supported (e.g., PUSCH aggregation factor of 1 is only allowed for message 3), then a UE in an RRC CONNECTED state performing a contention-based random access procedure may ignore UE-specifically and BWP-specifically configured PUSCH aggregation factors (e.g., via 'pusch-AggregationFactor' IE) and transmit message 3 PUSCH only in one slot with a PUSCH aggregation factor of 1 (e.g., without repetition).

In certain embodiments, the aggregation factor signalled within a RAR may override a UE-specifically configured PUSCH aggregation factor (e.g., PUSCH aggregation factor configured in a PUSCH-config IE) for RRC CONNECTED UEs performing a contention-based random access procedure. In some embodiments, a UE if ordered by a random access response to apply slot aggregation with a certain aggregation factor for message 3 may follow control information signalled within the random access response message and ignore a pusch-AggregationFactor IE configured within PUSCH-config IE.

In certain embodiments, a UE in an RRC CONNECTED state performing a contention-based random access procedure may ignore aggregation related control information (e.g., the aggregation factor for message 3 or some indication ordering the UE to apply a preconfigured aggregation factor for message 3) signaled within a random access response message. Because a RRC_CONNECTED UE may be configured with an aggregation factor to be applied for PUSCH transmissions (e.g., pusch-AggregationFactor IE which is a UE specific PUSCH parameter applicable to a particular BWP and configured in PUSCH-config IE), the UE may apply the pusch-aggregationFactor configured in PUSCH-config IE for the message 3 PUSCH transmission instead of applying an aggregation factor as indicated by a RAR message. In various embodiments, only UEs in an RRC IDLE mode (e.g., transmission of RRC connection request in message 3) or UEs in an RRC INACTIVE mode (e.g., transmission of an RRC connection resume request message) may apply the slot aggregation for message 3 as indicated by a RAR.

In certain embodiments, a NE is not aware (e.g., until the reception of message 3) of whether a contention-based random access procedure is performed by a UE in an RRC_IDLE, RRC_INACTIVE, or RRC_CONNECTED state. Therefore, UEs performing contention-based random access procedures in a cell may follow a PUSCH aggregation factor of message 3, which may be indicated in a RAR, predefined in a specification, or configured via system information (e.g., SIB1).

As may be appreciated, any of the embodiments described herein may be combined together as suitable.

Figure 5:
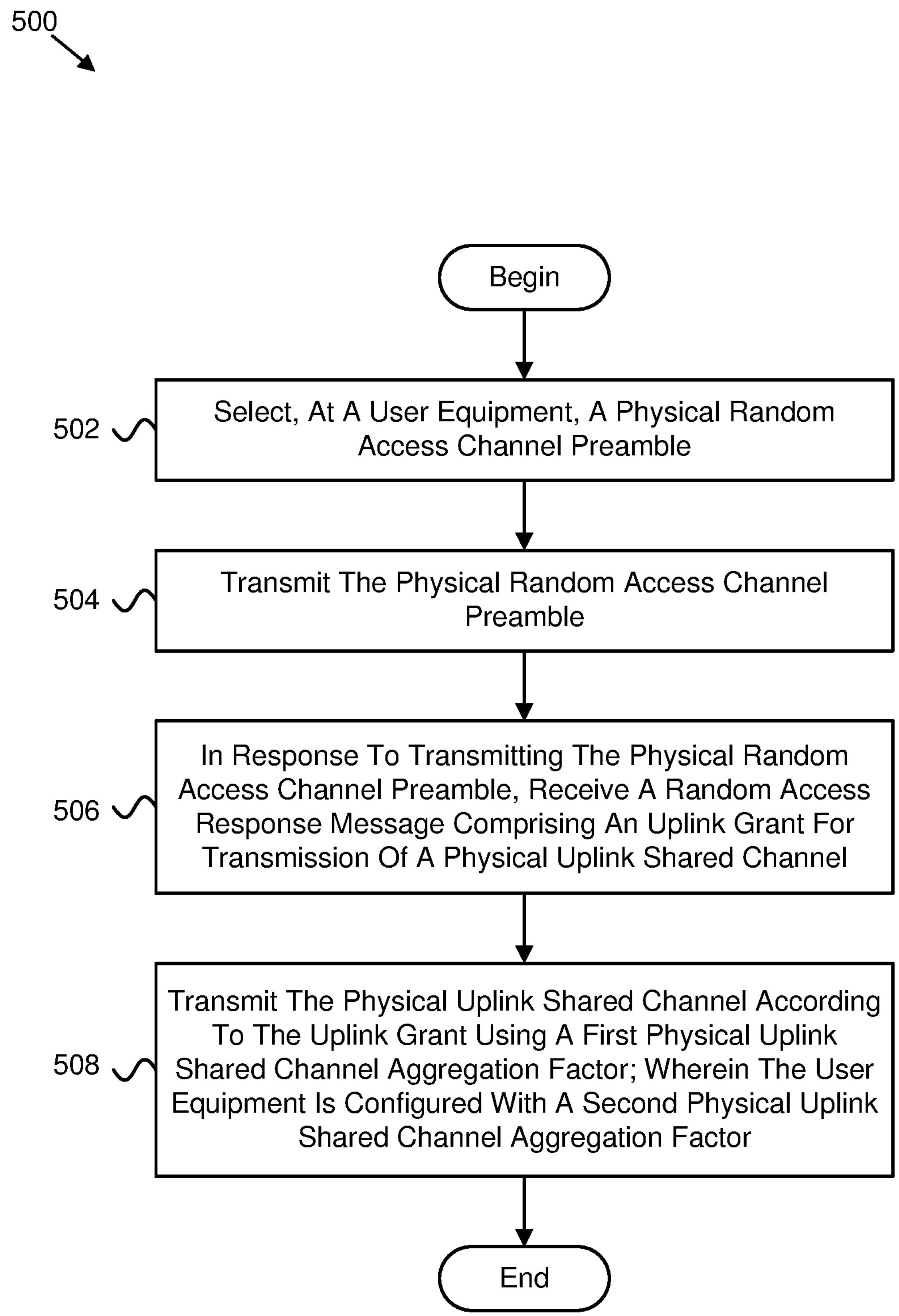
FIG. 5 is a flow chart diagram illustrating one embodiment of a method for PUSCH transmission using an aggregation factor.

FIG. 5 is a flow chart diagram illustrating one embodiment of a method 500 for PUSCH transmission using an aggregation factor. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include selecting 502, at a user equipment (e.g., the remote unit 102), a physical random access channel preamble. In certain embodiments, the method 500 includes transmitting 504 the physical random access channel preamble. In some embodiments, the method 500 includes, in response to transmitting the physical random access channel preamble, receiving 506 a random access response message comprising an uplink grant for transmission of a physical uplink shared channel. In various embodiments, the method 500 includes transmitting 508 the physical uplink shared channel according to the uplink grant using a first physical uplink shared channel aggregation factor. In such embodiments, the user equipment is configured with a second physical uplink shared channel aggregation factor.

In certain embodiments, the first physical uplink shared channel aggregation factor is a predefined value. In some embodiments, the predefined value is one. In various embodiments, the second physical uplink shared channel aggregation factor is user equipment specific.

In one embodiment, the second physical uplink shared channel aggregation factor is configured for a bandwidth part. In certain embodiments, the first physical uplink shared channel aggregation factor is different than the second physical uplink shared channel aggregation factor. In some embodiments, the physical random access channel preamble is randomly selected for a contention-based random access procedure.

In various embodiments, the first physical uplink shared channel aggregation factor is the same as the second physical uplink shared channel aggregation factor. In one embodiment, the method 500 further comprises receiving an indication of an indicated physical random access channel preamble, wherein selecting the physical random access channel preamble comprises selecting the indicated physical random access channel preamble for a contention-free random access procedure. In certain embodiments, the random access response message includes information indicating the first physical uplink shared channel aggregation factor.

In some embodiments, the information indicating the first physical uplink shared channel aggregation factor is included in the uplink grant. In various embodiments, the method 500 further comprises: determining a transport block size of the physical uplink shared channel based on the uplink grant, and determining the first physical uplink shared channel aggregation factor based on the transport block size. In one embodiment, the method 500 further comprises receiving a system information message, wherein the system information message includes an indication of the first physical uplink shared channel aggregation factor.

Figure 6:
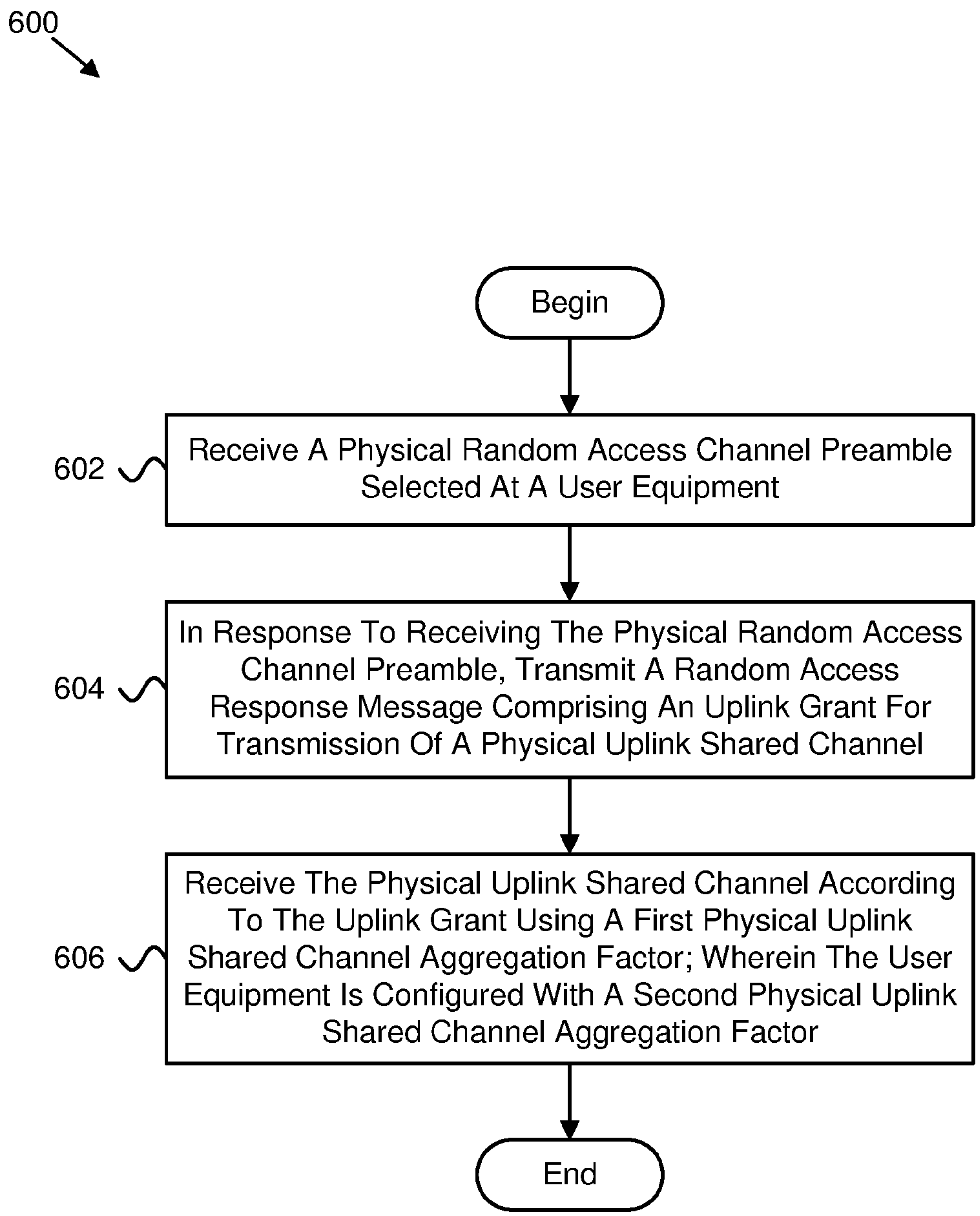
FIG. 6 is a flow chart diagram illustrating one embodiment of a method for PUSCH reception using an aggregation factor.

FIG. 6 is a flow chart diagram illustrating one embodiment of a method 600 for PUSCH reception using an aggregation factor. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

The method 600 may include receiving 602 a physical random access channel preamble selected at a user equipment. In certain embodiments, the method 600 includes, in response to receiving the physical random access channel preamble, transmitting 604 a random access response message comprising an uplink grant for transmission of a physical uplink shared channel. In some embodiments, the method 600 includes receiving 606 the physical uplink shared channel according to the uplink grant using a first physical uplink shared channel aggregation factor. In such embodiments, the user equipment is configured with a second physical uplink shared channel aggregation factor.

In certain embodiments, the first physical uplink shared channel aggregation factor is a predefined value. In some embodiments, the predefined value is one. In various embodiments, the second physical uplink shared channel aggregation factor is user equipment specific.

In one embodiment, the second physical uplink shared channel aggregation factor is configured for a bandwidth part. In certain embodiments, the first physical uplink shared channel aggregation factor is different than the second physical uplink shared channel aggregation factor. In some embodiments, the physical random access channel preamble is randomly selected for a contention-based random access procedure.

In various embodiments, the first physical uplink shared channel aggregation factor is the same as the second physical uplink shared channel aggregation factor. In one embodiment, the method 600 further comprises transmitting an indication of an indicated physical random access channel preamble. In certain embodiments, the random access response message includes information indicating the first physical uplink shared channel aggregation factor.

In some embodiments, the information indicating the first physical uplink shared channel aggregation factor is included in the uplink grant. In various embodiments, the method 600 further comprises transmitting a system information message, wherein the system information message includes an indication of the first physical uplink shared channel aggregation factor.

Figure 7:
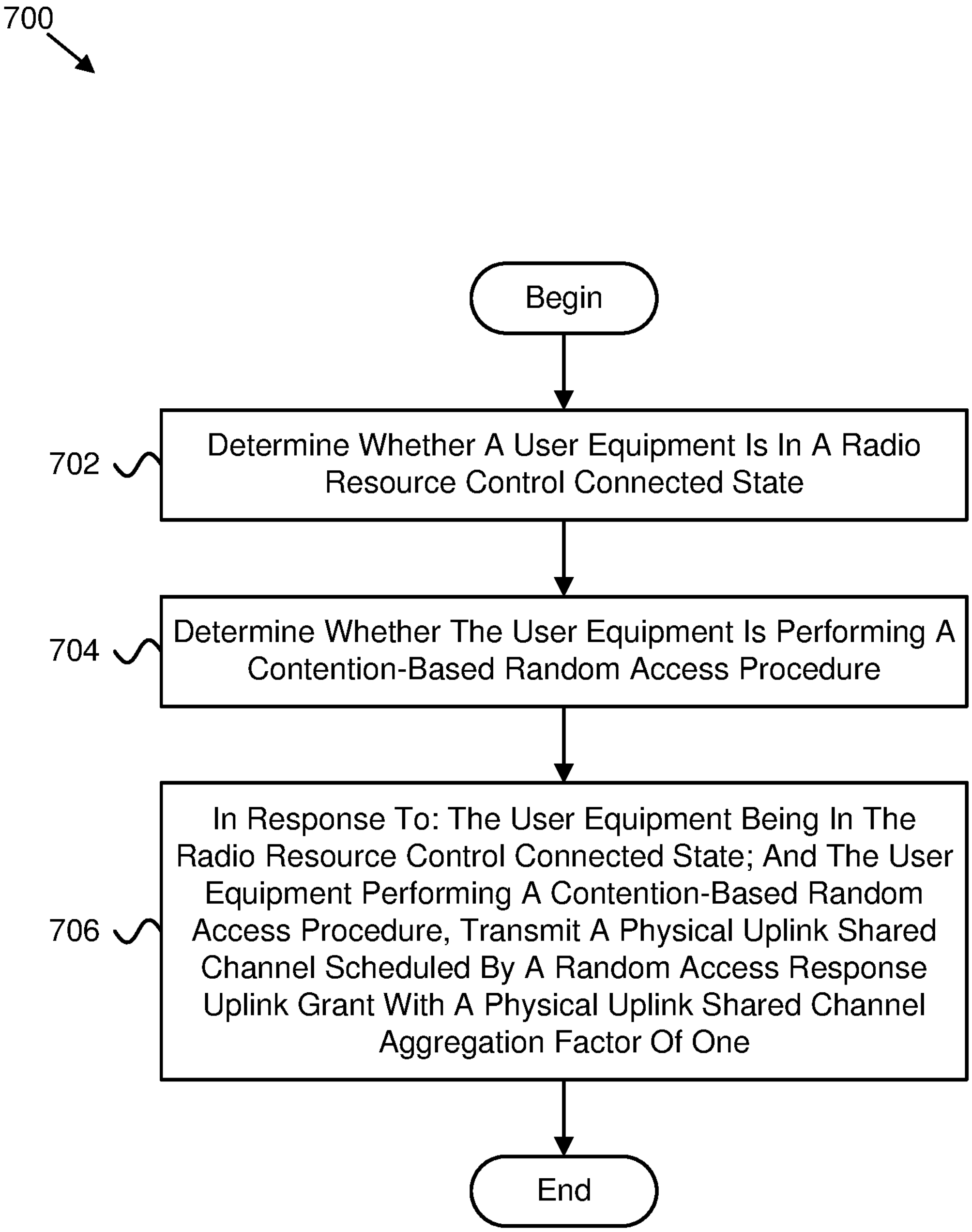
FIG. 7 is a flow chart diagram illustrating another embodiment of a method for PUSCH transmission using an aggregation factor.

FIG. 7 is a flow chart diagram illustrating another embodiment of a method 700 for PUSCH transmission using an aggregation factor. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include determining 702 whether a user equipment is in a radio resource control connected state. In some embodiments, the method 700 includes determining 704 whether the user equipment is performing a contention-based random access procedure. In various embodiments, the method 700 includes in response to: the user equipment being in the radio resource control connected state; and the user equipment performing a contention-based random access procedure, transmitting 706 a physical uplink shared channel scheduled by a random access response uplink grant with a physical uplink shared channel aggregation factor of one.

In certain embodiments, the method 700 further comprises, in response to: a repetition of the physical uplink shared channel scheduled by a random access response uplink grant not being supported; the user equipment being in the radio resource control connected state; and the user equipment performing a contention-based random access procedure, ignoring a user equipment specific physical uplink shared channel aggregation factor configuration. In some embodiments, the user equipment specific physical uplink shared channel aggregation factor is configured for a bandwidth part. In various embodiments, the method 700 further comprises determining a random access response aggregation factor.

In one embodiment, the method 700 further comprises using the random access response aggregation factor instead of a user equipment configured physical uplink shared channel aggregation factor. In certain embodiments, the method 700 further comprises, in response to: determining the random access response aggregation factor; the user equipment being in the radio resource control connected state; and the user equipment performing a contention-based random access procedure, transmitting the physical uplink shared channel scheduled by a random access response uplink grant using slot aggregation with the physical uplink shared channel aggregation factor being equal to the random access response aggregation factor. In some embodiments, the method 700 further comprises, in response to: determining the random access response aggregation factor; the user equipment being in the radio resource control connected state; and the user equipment performing a contention-based random access procedure, transmitting the physical uplink shared channel scheduled by a random access response uplink grant in one slot with the physical uplink shared channel aggregation factor equal to one.

In various embodiments, the method 700 further comprises, in response to: determining the random access response aggregation factor; the user equipment being in the radio resource control connected state; and the user equipment performing a contention-based random access procedure, ignoring the random access response aggregation factor. In one embodiment, the method 700 further comprises transmitting the physical uplink shared channel scheduled by a random access response uplink grant using slot aggregation with the physical uplink shared channel aggregation factor being equal to a user equipment configured physical uplink shared channel aggregation factor.

Figure 8:
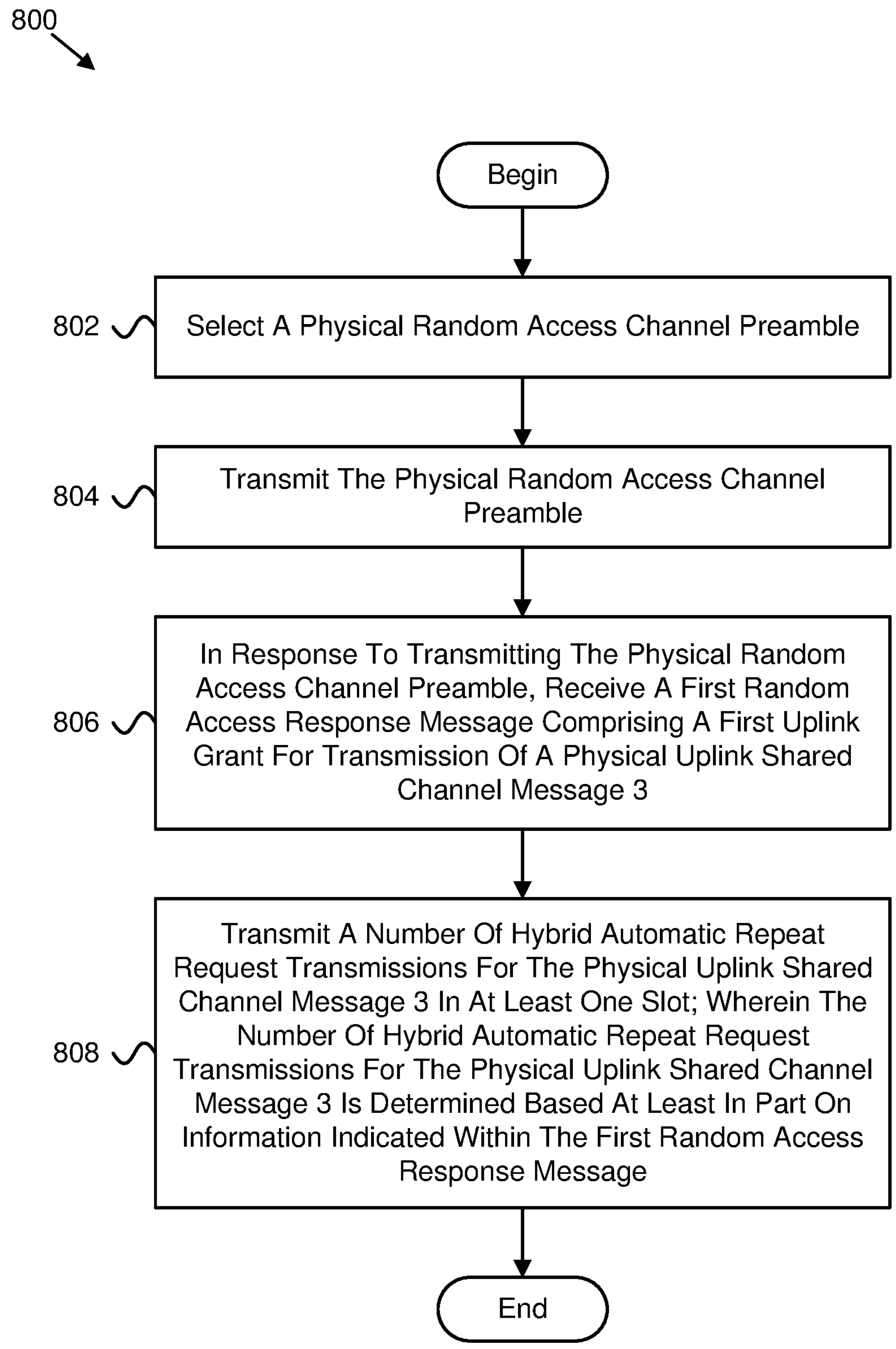
FIG. 8 is a flow chart diagram illustrating a further embodiment of a method for PUSCH transmission using an aggregation factor.

FIG. 8 is a flow chart diagram illustrating a further embodiment of a method 800 for PUSCH transmission using an aggregation factor. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include selecting 802 a physical random access channel preamble. In certain embodiments, the method 800 includes transmitting 804 the physical random access channel preamble. In some embodiments, the method 800 includes, in response to transmitting the physical random access channel preamble, receiving 806 a first random access response message comprising a first uplink grant for transmission of a physical uplink shared channel message 3. In various embodiments, the method 800 includes transmitting 808 a number of hybrid automatic repeat request transmissions for the physical uplink shared channel message 3 in at least one slot. In such embodiments, the number of hybrid automatic repeat request transmissions for the physical uplink shared channel message 3 is determined based at least in part on information indicated within the first random access response message.

In certain embodiments, the information comprises a transport block size of the physical uplink shared channel message 3. In some embodiments, the number of hybrid automatic repeat request transmissions for the physical uplink shared channel message 3 is a first value if the transport block size of physical uplink shared channel message 3 is less than a predetermined threshold and a second value if the transport block size of physical uplink shared channel message 3 is greater than or equal to the predetermined threshold. In various embodiments, the second value is larger than the first value.

In one embodiment, the predetermined threshold is configured by a network entity. In certain embodiments, the first value is 1. In some embodiments, the second value is indicated via system information, the first random access response message, or a combination thereof.

In various embodiments, a user equipment is in a radio resource control connected state and is configured with a physical uplink shared channel aggregation factor, and the physical uplink shared channel aggregation factor corresponds to a first number of physical uplink shared channel hybrid automatic repeat request transmissions in a first number of consecutive slots. In one embodiment, selecting the physical random access channel preamble comprises receiving an indication of the physical random access channel preamble, and transmitting the number of hybrid automatic repeat request transmissions for the physical shared channel message comprises transmitting the first number of hybrid automatic repeat request transmissions in the first number of consecutive slots.

In certain embodiments, the number of hybrid automatic repeat request transmissions for the physical uplink shared channel message 3 is further determined based at least in part on a time domain resource allocation and a frequency domain resource allocation. In some embodiments, the method 800 further comprises transmitting a plurality of hybrid automatic repeat request transmissions for the physical uplink shared channel message 3 for a slot-based time-domain resource allocation.

In various embodiments, the method 800 further comprises transmitting a plurality of hybrid automatic repeat request transmissions for the physical uplink shared channel message 3 if a number of allocated resource blocks is less than a predetermined threshold. In one embodiment, the information comprises an aggregation factor. In certain embodiments, the information comprises an index corresponding to an aggregation factor.

In some embodiments, the physical random access channel preamble indicates whether slot aggregation is requested. In various embodiments, the information comprises a transmit power control command for message 3 physical uplink shared channel indication, a channel state information indication, a time domain resource allocation indication, a physical uplink shared channel configuration indication, a medium access control control element, or some combination thereof. In one embodiment, the method 800 further comprises receiving system information, wherein the number of hybrid automatic repeat request transmissions for the physical uplink shared channel message 3 is determined based at least in part on the system information.

In one embodiment, a method comprises: selecting, at a user equipment, a physical random access channel preamble; transmitting the physical random access channel preamble; in response to transmitting the physical random access channel preamble, receiving a random access response message comprising an uplink grant for transmission of a physical uplink shared channel; and transmitting the physical uplink shared channel according to the uplink grant using a first physical uplink shared channel aggregation factor; wherein the user equipment is configured with a second physical uplink shared channel aggregation factor.

In certain embodiments, the first physical uplink shared channel aggregation factor is a predefined value.

In some embodiments, the predefined value is one.

In various embodiments, the second physical uplink shared channel aggregation factor is user equipment specific.

In one embodiment, the second physical uplink shared channel aggregation factor is configured for a bandwidth part.

In certain embodiments, the first physical uplink shared channel aggregation factor is different than the second physical uplink shared channel aggregation factor.

In some embodiments, the physical random access channel preamble is randomly selected for a contention-based random access procedure.

In various embodiments, the first physical uplink shared channel aggregation factor is the same as the second physical uplink shared channel aggregation factor.

In one embodiment, the method further comprises receiving an indication of an indicated physical random access channel preamble, wherein selecting the physical random access channel preamble comprises selecting the indicated physical random access channel preamble for a contention-free random access procedure.

In certain embodiments, the random access response message includes information indicating the first physical uplink shared channel aggregation factor.

In some embodiments, the information indicating the first physical uplink shared channel aggregation factor is included in the uplink grant.

In various embodiments, the method further comprises: determining a transport block size of the physical uplink shared channel based on the uplink grant, and determining the first physical uplink shared channel aggregation factor based on the transport block size.

In one embodiment, the method further comprises receiving a system information message, wherein the system information message includes an indication of the first physical uplink shared channel aggregation factor.

In one embodiment, an apparatus comprises a user equipment, the apparatus comprising: a processor that selects, at the user equipment, a physical random access channel preamble; a transmitter that transmits the physical random access channel preamble; and a receiver that, in response to transmitting the physical random access channel preamble, receives a random access response message comprising an uplink grant for transmission of a physical uplink shared channel; wherein the transmitter transmits the physical uplink shared channel according to the uplink grant using a first physical uplink shared channel aggregation factor, and the user equipment is configured with a second physical uplink shared channel aggregation factor.

In certain embodiments, the first physical uplink shared channel aggregation factor is a predefined value.

In some embodiments, the predefined value is one.

In various embodiments, the second physical uplink shared channel aggregation factor is user equipment specific.

In one embodiment, the second physical uplink shared channel aggregation factor is configured for a bandwidth part.

In certain embodiments, the first physical uplink shared channel aggregation factor is different than the second physical uplink shared channel aggregation factor.

In some embodiments, the physical random access channel preamble is randomly selected for a contention-based random access procedure.

In various embodiments, the first physical uplink shared channel aggregation factor is the same as the second physical uplink shared channel aggregation factor.

In one embodiment, the receiver receives an indication of an indicated physical random access channel preamble, wherein selecting the physical random access channel preamble comprises selecting the indicated physical random access channel preamble for a contention-free random access procedure.

In certain embodiments, the random access response message includes information indicating the first physical uplink shared channel aggregation factor.

In some embodiments, the information indicating the first physical uplink shared channel aggregation factor is included in the uplink grant.

In various embodiments, the processor: determines a transport block size of the physical uplink shared channel based on the uplink grant, and determines the first physical uplink shared channel aggregation factor based on the transport block size.

In one embodiment, the receiver receives a system information message, and the system information message includes an indication of the first physical uplink shared channel aggregation factor.

In one embodiment, a method comprises: receiving a physical random access channel preamble selected at a user equipment; in response to receiving the physical random access channel preamble, transmitting a random access response message comprising an uplink grant for transmission of a physical uplink shared channel; and receiving the physical uplink shared channel according to the uplink grant using a first physical uplink shared channel aggregation factor; wherein the user equipment is configured with a second physical uplink shared channel aggregation factor.

In certain embodiments, the first physical uplink shared channel aggregation factor is a predefined value.

In some embodiments, the predefined value is one.

In various embodiments, the second physical uplink shared channel aggregation factor is user equipment specific.

In one embodiment, the second physical uplink shared channel aggregation factor is configured for a bandwidth part.

In certain embodiments, the first physical uplink shared channel aggregation factor is different than the second physical uplink shared channel aggregation factor.

In some embodiments, the physical random access channel preamble is randomly selected for a contention-based random access procedure.

In various embodiments, the first physical uplink shared channel aggregation factor is the same as the second physical uplink shared channel aggregation factor.

In one embodiment, the method further comprises transmitting an indication of an indicated physical random access channel preamble.

In certain embodiments, the random access response message includes information indicating the first physical uplink shared channel aggregation factor.

In some embodiments, the information indicating the first physical uplink shared channel aggregation factor is included in the uplink grant.

In various embodiments, the method further comprises transmitting a system information message, wherein the system information message includes an indication of the first physical uplink shared channel aggregation factor.

In one embodiment, an apparatus comprises: a receiver that receives a physical random access channel preamble selected at a user equipment; and a transmitter that, in response to receiving the physical random access channel preamble, transmits a random access response message comprising an uplink grant for transmission of a physical uplink shared channel; wherein the receiver receives the physical uplink shared channel according to the uplink grant using a first physical uplink shared channel aggregation factor, and the user equipment is configured with a second physical uplink shared channel aggregation factor.

In certain embodiments, the first physical uplink shared channel aggregation factor is a predefined value.

In some embodiments, the predefined value is one.

In various embodiments, the second physical uplink shared channel aggregation factor is user equipment specific.

In one embodiment, the second physical uplink shared channel aggregation factor is configured for a bandwidth part.

In certain embodiments, the first physical uplink shared channel aggregation factor is different than the second physical uplink shared channel aggregation factor.

In some embodiments, the physical random access channel preamble is randomly selected for a contention-based random access procedure.

In various embodiments, the first physical uplink shared channel aggregation factor is the same as the second physical uplink shared channel aggregation factor.

In one embodiment, the transmitter transmits an indication of an indicated physical random access channel preamble.

In certain embodiments, the random access response message includes information indicating the first physical uplink shared channel aggregation factor.

In some embodiments, the information indicating the first physical uplink shared channel aggregation factor is included in the uplink grant.

In various embodiments, the transmitter transmits a system information message, and the system information message includes an indication of the first physical uplink shared channel aggregation factor.

In one embodiment, a method comprises: determining whether a user equipment is in a radio resource control connected state; determining whether the user equipment is performing a contention-based random access procedure; and in response to: the user equipment being in the radio resource control connected state; and the user equipment performing a contention-based random access procedure, transmitting a physical uplink shared channel scheduled by a random access response uplink grant with a physical uplink shared channel aggregation factor of one.

In certain embodiments, the method further comprises, in response to: a repetition of the physical uplink shared channel scheduled by a random access response uplink grant not being supported; the user equipment being in the radio resource control connected state; and the user equipment performing a contention-based random access procedure, ignoring a user equipment specific physical uplink shared channel aggregation factor configuration.

In some embodiments, the user equipment specific physical uplink shared channel aggregation factor is configured for a bandwidth part.

In various embodiments, the method further comprises determining a random access response aggregation factor.

In one embodiment, the method further comprises using the random access response aggregation factor instead of a user equipment configured physical uplink shared channel aggregation factor.

In certain embodiments, the method further comprises, in response to: determining the random access response aggregation factor; the user equipment being in the radio resource control connected state; and the user equipment performing a contention-based random access procedure, transmitting the physical uplink shared channel scheduled by a random access response uplink grant using slot aggregation with the physical uplink shared channel aggregation factor being equal to the random access response aggregation factor.

In some embodiments, the method further comprises, in response to: determining the random access response aggregation factor; the user equipment being in the radio resource control connected state; and the user equipment performing a contention-based random access procedure, transmitting the physical uplink shared channel scheduled by a random access response uplink grant in one slot with the physical uplink shared channel aggregation factor equal to one.

In various embodiments, the method further comprises, in response to: determining the random access response aggregation factor; the user equipment being in the radio resource control connected state; and the user equipment performing a contention-based random access procedure, ignoring the random access response aggregation factor.

In one embodiment, the method further comprises transmitting the physical uplink shared channel scheduled by a random access response uplink grant using slot aggregation with the physical uplink shared channel aggregation factor being equal to a user equipment configured physical uplink shared channel aggregation factor.

In one embodiment, an apparatus comprises a user equipment, wherein the apparatus comprises: a processor that: determines whether the user equipment is in a radio resource control connected state; and determines whether the user equipment is performing a contention-based random access procedure; and a transmitter that, in response to: the user equipment being in the radio resource control connected state; and the user equipment performing a contention-based random access procedure, transmits a physical uplink shared channel scheduled by a random access response uplink grant with a physical uplink shared channel aggregation factor of one.

In certain embodiments, the processor, in response to: a repetition of the physical uplink shared channel scheduled by a random access response uplink grant not being supported; the user equipment being in the radio resource control connected state; and the user equipment performing a contention-based random access procedure, ignores a user equipment specific physical uplink shared channel aggregation factor configuration.

In some embodiments, the user equipment specific physical uplink shared channel aggregation factor is configured for a bandwidth part.

In various embodiments, the processor determines a random access response aggregation factor.

In one embodiment, the processor uses the random access response aggregation factor instead of a user equipment configured physical uplink shared channel aggregation factor.

In certain embodiments, the transmitter, in response to: determining the random access response aggregation factor; the user equipment being in the radio resource control connected state; and the user equipment performing a contention-based random access procedure, transmits the physical uplink shared channel scheduled by a random access response uplink grant using slot aggregation with the physical uplink shared channel aggregation factor being equal to the random access response aggregation factor.

In some embodiments, the transmitter, in response to: determining the random access response aggregation factor; the user equipment being in the radio resource control connected state; and the user equipment performing a contention-based random access procedure, transmits the physical uplink shared channel scheduled by a random access response uplink grant in one slot with the physical uplink shared channel aggregation factor equal to one.

In various embodiments, the processor, in response to: determining the random access response aggregation factor; the user equipment being in the radio resource control connected state; and the user equipment performing a contention-based random access procedure, ignores the random access response aggregation factor.

In one embodiment, the transmitter transmits the physical uplink shared channel scheduled by a random access response uplink grant using slot aggregation with the physical uplink shared channel aggregation factor being equal to a user equipment configured physical uplink shared channel aggregation factor.

In one embodiment, a method comprises: selecting a physical random access channel preamble; transmitting the physical random access channel preamble; in response to transmitting the physical random access channel preamble, receiving a first random access response message comprising a first uplink grant for transmission of a physical uplink shared channel message 3; and transmitting a number of hybrid automatic repeat request transmissions for the physical uplink shared channel message 3 in at least one slot; wherein the number of hybrid automatic repeat request transmissions for the physical uplink shared channel message 3 is determined based at least in part on information indicated within the first random access response message.

In certain embodiments, the information comprises a transport block size of the physical uplink shared channel message 3.

In some embodiments, the number of hybrid automatic repeat request transmissions for the physical uplink shared channel message 3 is a first value if the transport block size of physical uplink shared channel message 3 is less than a predetermined threshold and a second value if the transport block size of physical uplink shared channel message 3 is greater than or equal to the predetermined threshold.

In various embodiments, the second value is larger than the first value.

In one embodiment, the predetermined threshold is configured by a network entity.

In certain embodiments, the first value is 1.

In some embodiments, the second value is indicated via system information, the first random access response message, or a combination thereof.

In various embodiments, a user equipment is in a radio resource control connected state and is configured with a physical uplink shared channel aggregation factor, and the physical uplink shared channel aggregation factor corresponds to a first number of physical uplink shared channel hybrid automatic repeat request transmissions in a first number of consecutive slots.

In one embodiment, selecting the physical random access channel preamble comprises receiving an indication of the physical random access channel preamble, and transmitting the number of hybrid automatic repeat request transmissions for the physical shared channel message comprises transmitting the first number of hybrid automatic repeat request transmissions in the first number of consecutive slots.

In certain embodiments, the number of hybrid automatic repeat request transmissions for the physical uplink shared channel message 3 is further determined based at least in part on a time domain resource allocation and a frequency domain resource allocation.

In some embodiments, the method further comprises transmitting a plurality of hybrid automatic repeat request transmissions for the physical uplink shared channel message 3 for a slot-based time-domain resource allocation.

In various embodiments, the method further comprises transmitting a plurality of hybrid automatic repeat request transmissions for the physical uplink shared channel message 3 if a number of allocated resource blocks is less than a predetermined threshold.

In one embodiment, the information comprises an aggregation factor.

In certain embodiments, the information comprises an index corresponding to an aggregation factor.

In some embodiments, the physical random access channel preamble indicates whether slot aggregation is requested.

In various embodiments, the information comprises a transmit power control command for message 3 physical uplink shared channel indication, a channel state information indication, a time domain resource allocation indication, a physical uplink shared channel configuration indication, a medium access control control element, or some combination thereof.

In one embodiment, the method further comprises receiving system information, wherein the number of hybrid automatic repeat request transmissions for the physical uplink shared channel message 3 is determined based at least in part on the system information.

In one embodiment, an apparatus comprises: a processor that selects a physical random access channel preamble; a transmitter that transmits the physical random access channel preamble; and a receiver that, in response to transmitting the physical random access channel preamble, receives a first random access response message comprising a first uplink grant for transmission of a physical uplink shared channel message 3; wherein the transmitter transmits a number of hybrid automatic repeat request transmissions for the physical uplink shared channel message 3 in at least one slot, and the number of hybrid automatic repeat request transmissions for the physical uplink shared channel message 3 is determined based at least in part on information indicated within the first random access response message.

In certain embodiments, the information comprises a transport block size of the physical uplink shared channel message 3.

In some embodiments, the number of hybrid automatic repeat request transmissions for the physical uplink shared channel message 3 is a first value if the transport block size of physical uplink shared channel message 3 is less than a predetermined threshold and a second value if the transport block size of physical uplink shared channel message 3 is greater than or equal to the predetermined threshold.

In various embodiments, the second value is larger than the first value.

In one embodiment, the predetermined threshold is configured by a network entity.

In certain embodiments, the first value is 1.

In some embodiments, the second value is indicated via system information, the first random access response message, or a combination thereof.

In various embodiments, the apparatus is in a radio resource control connected state and is configured with a physical uplink shared channel aggregation factor, and the physical uplink shared channel aggregation factor corresponds to a first number of physical uplink shared channel hybrid automatic repeat request transmissions in a first number of consecutive slots.

In one embodiment, the processor selecting the physical random access channel preamble comprises the receiver receiving an indication of the physical random access channel preamble, and the transmitter transmitting the number of hybrid automatic repeat request transmissions for the physical shared channel message comprises the transmitter transmitting the first number of hybrid automatic repeat request transmissions in the first number of consecutive slots.

In certain embodiments, the number of hybrid automatic repeat request transmissions for the physical uplink shared channel message 3 is further determined based at least in part on a time domain resource allocation and a frequency domain resource allocation.

In some embodiments, the transmitter transmits a plurality of hybrid automatic repeat request transmissions for the physical uplink shared channel message 3 for a slot-based time-domain resource allocation.

In various embodiments, the transmitter transmits a plurality of hybrid automatic repeat request transmissions for the physical uplink shared channel message 3 if a number of allocated resource blocks is less than a predetermined threshold.

In one embodiment, the information comprises an aggregation factor.

In certain embodiments, the information comprises an index corresponding to an aggregation factor.

In some embodiments, the physical random access channel preamble indicates whether slot aggregation is requested.

In various embodiments, the information comprises a transmit power control command for message 3 physical uplink shared channel indication, a channel state information indication, a time domain resource allocation indication, a physical uplink shared channel configuration indication, a medium access control control element, or some combination thereof.

In one embodiment, the receiver receives system information, and the number of hybrid automatic repeat request transmissions for the physical uplink shared channel message 3 is determined based at least in part on the system information.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
- at least one memory comprising a non-transitory computer-readable medium storing code; and
- at least one processor coupled with the at least one memory and configured to execute the code comprising instructions to cause the UE to:
- select random access resources for a physical random access channel (PRACH) preamble transmission, wherein the random access resources indicate a request for Msg3 repetition;
- transmit the PRACH preamble;
- in response to transmitting the PRACH preamble, receive a random access response (RAR) message comprising an uplink grant for transmission of a physical uplink shared channel (PUSCH) transmission, wherein the RAR message includes information indicating a PUSCH repetition number; and
- transmit the PUSCH transmission according to the uplink grant using the PUSCH repetition number, wherein information indicating the PUSCH repetition number is included in the uplink grant.

2. The UE of claim 1, wherein the PUSCH repetition number is UE specific.

3. The UE of claim 1, wherein the PUSCH repetition number is configured for a bandwidth part.

4. The UE of claim 1, wherein the PRACH preamble is selected for a contention-based random access procedure.

5. The UE of claim 1, wherein the information indicating the PUSCH repetition number comprises an index associated with a table having defined repetition numbers.

6. A processor for wireless communication, comprising:
- at least one controller coupled with at least one memory comprising a non-transitory computer-readable medium storing code and configured to execute the code comprising instructions to cause the processor to:
- select random access resources for a physical random access channel (PRACH) preamble transmission, wherein the random access resources indicate a request for Msg3 repetition;
- transmit the PRACH preamble;
- in response to transmitting the PRACH preamble, receive a random access response (RAR) message comprising an uplink grant for transmission of a physical uplink shared channel (PUSCH) transmission, wherein the RAR message includes information indicating a PUSCH repetition number; and transmit the PUSCH transmission according to the uplink grant using the PUSCH repetition number, wherein information indicating the PUSCH repetition number is included in the uplink grant.

7. The processor of claim 6, wherein the PUSCH repetition number is user equipment (UE) specific.

8. The processor of claim 6, wherein the PUSCH repetition number is configured for a bandwidth part.

9. The processor of claim 6, wherein the PRACH preamble is selected for a contention-based random access procedure.

10. The processor of claim 6, wherein the information indicating the PUSCH repetition number comprises an index associated with a table having defined repetition numbers.

11. A method at a user equipment (UE), the method comprising:

selecting random access resources for a physical random access channel (PRACH) preamble transmission, wherein the random access resources indicate a request for Msg3 repetition;

transmitting the PRACH preamble;

in response to transmitting the PRACH preamble, receiving a random access response (RAR) message comprising an uplink grant for transmission of a physical uplink shared channel (PUSCH) transmission, wherein the RAR message includes information indicating a PUSCH repetition number; and transmitting the PUSCH transmission according to the uplink grant using the PUSCH repetition number, wherein information indicating the PUSCH repetition number is included in the uplink grant.

12. The method of claim 11, wherein the PUSCH repetition number is UE specific.

13. The method of claim 11, wherein the PUSCH repetition number is configured for a bandwidth part.

14. The method of claim 11, wherein the PRACH preamble is selected for a contention-based random access procedure.

15. The method of claim 11, wherein the information indicating the PUSCH repetition number comprises an index associated with a table having defined repetition numbers.

16. A base station, comprising:

at least one memory comprising a non-transitory computer-readable medium storing code; and at least one processor coupled with the at least one memory and configured to execute the code comprising instructions to cause the base station to:

receive a physical random access channel (PRACH) preamble, wherein random access resources for the PRACH preamble indicate a request for Msg3 repetition;

in response to receiving the PRACH preamble, transmit a random access response (RAR) message comprising an uplink grant for transmission of a physical uplink shared channel (PUSCH) transmission, wherein the RAR message includes information indicating a PUSCH repetition number; and receive a PUSCH transmission according to the uplink grant using the PUSCH repetition number, wherein information indicating the PUSCH repetition number is included in the uplink grant.

17. The base station of claim 16, wherein the PUSCH repetition number is user equipment (UE) specific.

18. The base station of claim 16, wherein the PUSCH repetition number is configured for a bandwidth part.

19. The base station of claim 16, wherein the PRACH preamble is selected for a contention-based random access procedure.

20. The base station of claim 16, wherein the information indicating the PUSCH repetition number comprises an index associated with a table having defined repetition numbers.

* * * * *